No. 777,590. PATENTED DEC. 13, 1904.
A. A. DE BONNEVILLE.
POTATO PEELING MACHINE.
APPLICATION FILED JAN. 16, 1904.
NO MODEL. 2 SHEETS—SHEET 2.
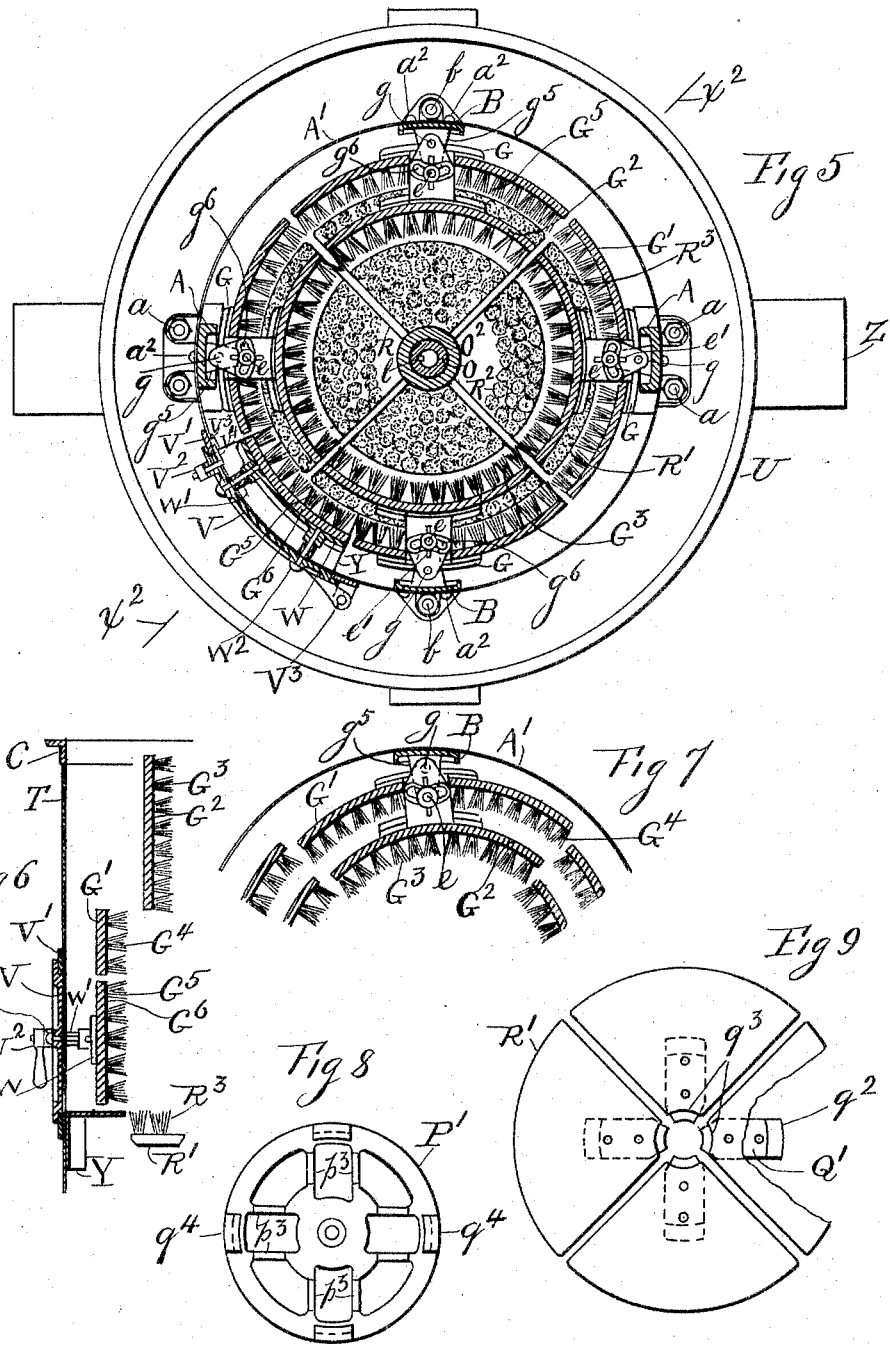
Witnesses
Inventor
Arthur A. de Bonneville No. 777,590.

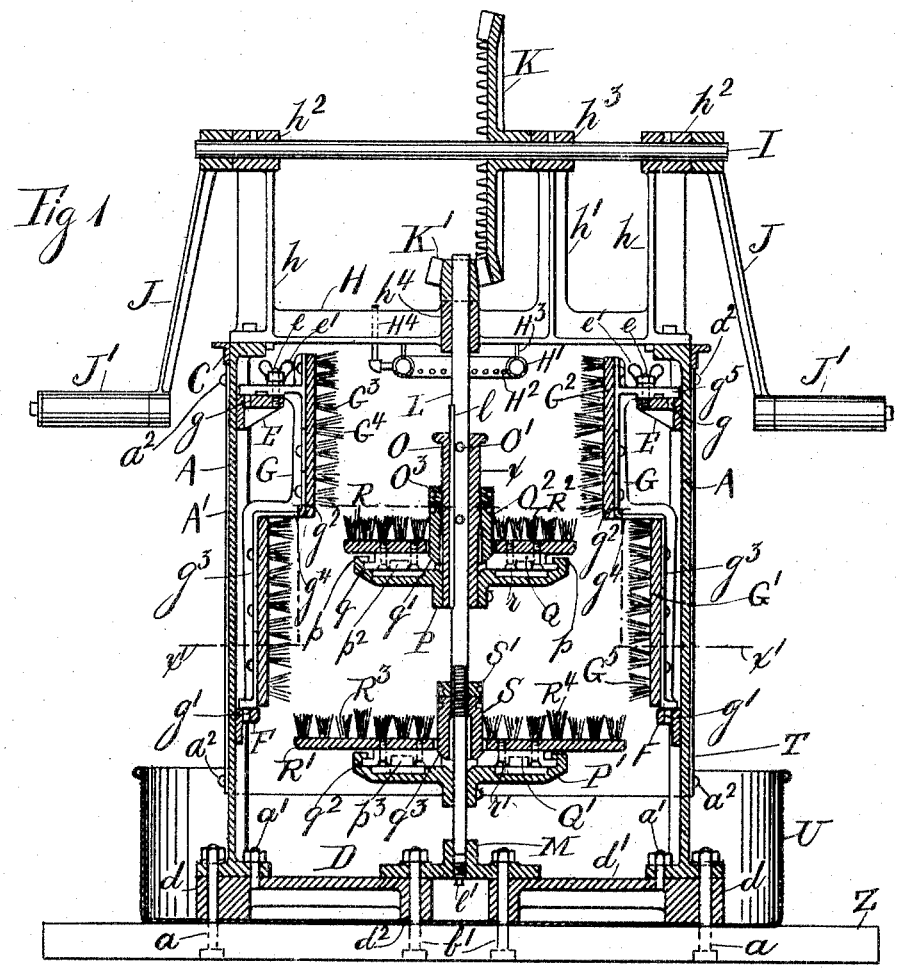

Patented December 13, 1904.

UNITED STATES PATENT OFFICE.

ARTHUR A. DE BONNEVILLE, OF BAYONNE, NEW JERSEY, ASSIGNOR TO WILLIAM HENRY LAIRD, OF NEW YORK, N. Y.

POTATO-PEELING MACHINE.

SPECIFICATION forming part of Letters Patent No. 777,590, dated December 13, 1904.

Application filed January 16, 1904. Serial No. 189,296. (No model.)

*To all whom it may concern:*

Be it known that I, ARTHUR A. DE BONNEVILLE, a citizen of the United States, and a resident of Bayonne, in the county of Hudson and State of New Jersey, have invented certain new and useful Improvements in Potato-Peeling Machines, of which the following is a specification.

This invention relates to means for cleaning and peeling various fruits, potatoes, and the like; and its object is the production of a machine in which the fruit or potatoes to be cleaned or peeled are forced against and over brushes and the like, thereby removing from them any dust, dirt, &c., and finally peeling them, if so desired.

The organization of the invention comprises two or more parallel disks of different diameters carrying brushes, means to revolve said disks in a cylinder or barrel with diameters corresponding to the disks and having brushes at their sides forming the outer brushes of the apparatus, means to easily detach the brushes, means to place the brushes of the barrel at various inclinations to each other, with means to water the fruit or potatoes that are being operated upon, and the elements of the invention so disposed to obtain a machine which will not allow the accumulation of the dust, foreign matter, or parings in and about the brushes. The disks rotating force the material acted upon against the inner surface of the barrel, carrying the brushes by virtue of centrifugal force, and they are then thrown back again in various directions on the brushes of the revolving disks. The walls of the barrels are made in sections, which on account of being capable of being inclined to each other break the smooth cylindrical inner surfaces thereof, and by so doing present an uneven surface for the potatoes and the like to be actuated upon, making the brushes of one section protrude above those of an adjacent section. The upper disk is arranged to move in a vertical direction relative to the lower disk, opening and closing communication between two chambers of the barrel of the machine, providing means to separate the smaller from the larger pieces of material to be operated upon, and after said separation allowing the larger and heavier material to be actuated by the small disk and the small pieces of the material to be actuated by the larger disk, thereby allowing the force with which the material is forced against the brushes of the barrel to be approximately equalized, securing thereby a machine which will peel and clean fruit, potatoes, and the like of different sizes and weights evenly—that is to say, the thickness of the parings will be the same.

In the drawings, Figure 1 represents a partial vertical axial section of the invention. Figs. 2 and 3 are partial plan views of portions of Fig. 1. Fig. 4 is a partial section of Fig. 1 on the line $x$. Fig. 5 is a partial plan view and section of Fig. 1 on the line $x'$ $x'$. Fig. 6 is a partial section of the invention as on the line $x^2$ $x^2$ of Fig. 5. Fig. 7 is a partial reproduction of Fig. 5 with some of the elements in different positions. Fig. 8 shows a plan view of a supporting-disk for brushes. Fig. 9 represents a plan view of segmental disks for brushes.

The invention is shown to consist of a frame comprising the legs A and B, united at their upper ends by a cross-tie H and a ring C and at their lower lower ends by the cross D. From the said legs there project the upper brackets E and the lower brackets F. Brush-holders G are pivoted to the said brackets by means of the pivots $g$ and $g'$, that extend from the holders G and enter suitable openings in the brackets E and F. The brush-holders G are here shown with the vertical body portions $g^2$ $g^3$ joined by the horizontal portion $g^4$. Each of the vertical body portions is curved with a radius having a center in the longitudinal axial center of the machine, the upper portion $g^2$ being of a smaller diameter than the lower portion $g^3$, and each of them holds an arc of the cylinder or barrel composed of brushes constituting the outer brushes of the machine. From the body portion $g^2$ there extends the table $g^5$, in which is formed the curved opening $g^6$, formed with radii struck from the center of the pivot $g$. A standing bolt $e$ is tapped into the bracket E and extends through the said opening $g^6$. A wing-nut $e'$ on the bolt $e$ allows the brush-holder G to be clamped in various angular positions from the center of the pivots $g$ $g'$.

On top of the legs A there is bolted a cross-tie H, having the uprights $h$ $h'$, which latter support journal-boxes $h^2$ $h^3$ for a shaft I, which is turned by cranks J, with handles J' extending therefrom. The shaft I also carries the bevel-wheel K, that meshes with the bevel-pinion K', supported on the vertical shaft L, that turns in the bearing $h^4$ of the frame H and in the foot-piece M, which latter is held on the cross D.

On the shaft L there is held in different vertical positions the sleeve O by means of the pin O', the said sleeve being connected with the shaft L by the spline $l$. A thread is formed on the outer cylindrical surface of the sleeve and carries a ring-wedge $O^2$ and a jam-nut $O^3$. At the lower end of the sleeve there is fastened the supporting-disk P, which is arranged to hold wedges Q, that extend from brush-sectors R, being fastened to the latter by the screws $r$. The wedges Q have lips $q$, that are held under hooks $p$ at the circumferential edge of the supporting-disk P, and the sides of the wedges fit between the guides $p^2$ of the said supporting-disk P. The brush-sectors, with the wedges Q, are held in proper position by means of the ring-wedges $O^2$ bearing against the inclined faces $q'$ of the said wedges. At S there is represented another ring-wedge, similar to P, with its jam-nut S', a supporting-disk P' being fastened directly to the shaft L. Wedges Q', with lips $q^2$, extend from the sectors of the brushes R', the said lips being held under the hooks $q^4$ and between the guides $p^3$ of the supporting-disk P'. The brush-sectors R' are held in proper position by means of the ring-wedges S bearing against the inclined faces $q^3$ of the wedges Q'. At the lower portion of the shaft there is directly secured thereto a second supporting-disk P'. A ring-wedge S turns on threads on the shaft L and is locked in position by the jam-nut S'. Brush-sectors R', with wedges Q', are carried on the supporting-disk P'. The wedges have lips $q^2$, that fit into the hooks $q^4$, formed in the upper surface of the supporting-disk P', which latter is also formed with the guides $p^3$. The brush-sectors R' are held in operative position on the supporting-disk by reason of the lower end of the ring-wedge S bearing against the beveled ends $q^3$ of the wedges Q, thereby forcing the lips $q^2$ under the hooks $q^4$.

On the outer cylindrical surface of the sleeve O there are formed threads for a ring-wedge $O^2$, which bears against the inclined ends $q'$ of wedges Q, similar to Q', the wedges Q carrying the brush-segments R, and are held on a supporting-disk P, similar to P', the disk P being secured to the sleeve O, and has hooks $p$ for lips $q$ of the wedges Q, the latter being also held between the guides $p^2$.

The cross D is composed of the central portion $d^2$, outer portions $d$ and $d^4$, with the arms $d'$ and $d^3$, the legs A and B being connected to the outer portions by means of the bolts $a$, $a'$, and $b$, and the central portion $d^2$ supports the foot-piece M by means of bolts $b'$. In the foot-piece M there is tapped a screw $l'$, that bears up against the end of the shaft L, thereby allowing its vertical adjustment.

A pan U is placed under the cross D and is secured thereto and to foundation-timbers Z by means of the bolts passing through the pan U. The cross D is elevated above the bottom of the pan U to prevent leaks through the bolt-holes in the cross.

At H' there is shown a pipe-ring with perforations $H^2$, hangers $H^3$, extending from the frame H, and inlet-piping $H^4$ for water.

Around the legs A and B is fastened a casing A' by means of screws $a^3$ and which projects below the top edge of the pan U.

A frame V', secured to the casing A', has hinged thereto the door V by means of the pins $V^3$. A brush-holder W is clamped to the door V by means of bolts $W^2$, separating-pieces W' being interposed between the door and the said brush-holder. A brush $G^6$, with bristles $G^5$, is secured to the holder W. A latch with handle $V^2$ and finger $V^4$ resting on a table $V^3$ extends from the frame V' and allows the door to be opened, closed, and clamped while closed. Tufts of bristles $R^2$ extend from the sectors R, and bristles $G^3$ extend from the upper portions of the holders G, forming an upper chamber in the machine. Bristles $R^3$ extend from the sectors R', and bristles $G^5$ extend from the lower portions of the brush-holders, forming a lower and larger chamber. It will also be noted that some of the tufts of bristles, like $G^4$ and $R^4$, may be longer than the tufts of the bristles adjacent to them. This may be true also of the tufts of the bristles on the upper sectors R and lower body portions of the brush-holders G.

It is evident that rasping or grating surfaces could be used in place of the brushes with bristles and that the bristles can be made of any kind of material.

To use the invention, the fruit, potatoes, and the like are placed in the upper chamber on the sectors R, the said sectors, with their supporting-disk, being lowered from the position shown in the drawing Fig. 1 by taking out the pin O' from the sleeve O and allowing the latter to slide down the spline $l$ of the shaft L. Then the cranks J are turned, by virtue of which the potatoes or fruit will be forced against the bristles $G^4$, and the smaller pieces of material acted upon will drop into the lower chamber on the brush-sectors R, and after the separation of the material has thus been accomplished the sleeve O, with its appurtenances, is again raised so as to be located as shown in the said Fig. 1, the cranks being still turned while water is allowed to trickle from the perforations H² of the ring-pipe H' and which finds its way from the upper to the lower chamber. After the fruit or potatoes have been sufficiently cleaned or pared the door V is opened, when those in the lower chamber will be ejected while the shaft L is kept turning. Next the upper disk-support P is lowered on the shaft L, when the contents of the upper chamber will drop into the lower chamber and will be ejected through the opening of the door V.

Having described my invention, I claim—

1. In a machine the combination of a shaft, means to rotate the shaft, a supporting-disk extending from the shaft, outer brushes surrounding the disk, brush-holders supporting the said outer brushes, pivots on the brush-holders parallel to the said shaft, legs in the machine-brackets extending from the legs and having openings for the pivots of the brush-holders, means to secure the outer brushes in different radial positions on the pivots, brush-sectors secured to the face of the supporting-disk.

2. In a machine the combination of a shaft, means to rotate the shaft, a supporting-disk extending from the shaft, brushes secured to the face of the disk, legs in the machine, removable brush-holders pivoted to the legs, the axes of the pivots parallel to the shaft of the machine, means to clamp the said brush-holders in different radial positions about the axes of the pivots.

3. In a machine the combination of a shaft, means to rotate the shaft, a supporting-disk extending from the shaft, hooks at the circumferential edge of the disk, wedges carried on the disk and engaged by the hooks, brush-sectors fastened to the wedges, a ring-wedge mounted on the shaft and arranged to be adjusted in the direction of the axis of the said shaft, and bearing against the wedges on the disk.

4. In a machine the combination of a shaft, means to rotate the shaft, a sleeve fitting the shaft, a spline between the shaft and sleeve, means to secure the sleeve in different vertical positions on the shaft, a supporting-disk extending from the sleeve, hooks at the circumferential edge of the disk, wedges carried on the disk engaged by the said hooks, brushes fastened to the wedges, a ring-wedge adjustably secured to the sleeve bearing against the wedges of the brushes.

5. In a machine the combination of a frame; a vertical shaft supported in the frame; means to rotate the shaft; supporting-disks of different diameters extending from the shaft, in planes at right angles to its axis, and rotating therewith; brushes on the disks, the brushes of one disk extending latterly beyond the brushes of an adjacent disk; brush-holders surrounding the disks; pivots with their axes parallel to the shaft of the machine, extending from the brush-holders and supported on the frame; brushes on the holders surrounding and in close proximity to the disks, forming different sets of outer brushes; means to fasten the brush-holders in different angular positions around the axes of their pivots.

6. In a machine the combination of a vertical shaft, means to rotate the shaft, a couple of supporting-disks extending from and perpendicular to the shaft, brushes detachably secured to the supporting-disks, one set of brushes of larger diameter and area than the other, legs in the machine, brush-holders pivoted to the legs, the axes of the pivots parallel to the shaft, brushes fastened to the holders, means to secure the said holders in different radial positions on their pivots, means to secure one of the supporting-disks in different vertical positions along the axis of the shaft.

7. In a cleaning and peeling machine the combination of an upper and lower chamber, the lower chamber of larger diameter than the upper; outer brushes constituting the sides of the chamber; vertical pivots for the said outer brushes; means to clamp the outer brushes in different angular positions on the axes of their pivots; a vertical shaft extending through the chambers; brushes extending from the shaft and forming the bottoms of the chambers; means to move one set of the latter brushes along the axis of the shaft, to open and close communication between the chambers.

8. In a potato-peeling machine the combination of legs, a casing around the legs, brush-holders vertically pivoted to the legs, brushes secured to the said holders, a vertical shaft extending through the longitudinal axis of the machine, a sleeve surrounding the shaft, a spline connecting the two latter elements, a ring-wedge on the sleeve, a supporting-disk secured to the sleeve below the ring-wedge, guides and hooks on the supporting-disk, wedges fitting between the guides and having lips to be engaged by the hooks of the supporting-disk, and the inner ends of the wedges beveled to be engaged by the ring-wedge, sectors of brushes secured to the wedges, a second supporting-disk below the first one and secured to the shaft, wedges held on the second supporting-disk, a ring-wedge on the shaft, jam-nuts for both ring-wedges, the end of the latter ring-wedge bearing against the wedges on the lower disk, a pin passing through the shaft and sleeve of the upper disk to clamp the latter in different positions, a door hinged over an opening in the casing to obtain access to the lower chamber.

Signed at New York, in the county of New York and State of New York, this 12th day of January, A. D. 1904.

ARTHUR A. DE BONNEVILLE.

Witnesses:
F. H. CARL,
RUFUS L. WEAVER.